(12) United States Patent
Weber

(10) Patent No.: US 8,307,044 B2
(45) Date of Patent: Nov. 6, 2012

(54) CIRCUITS, SYSTEMS, AND METHODS TO INTEGRATE STORAGE VIRTUALIZATION IN A STORAGE CONTROLLER

(75) Inventor: Bret S. Weber, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 253 days.

(21) Appl. No.: 12/200,643

(22) Filed: Aug. 28, 2008

(65) Prior Publication Data

US 2010/0057949 A1   Mar. 4, 2010

(51) Int. Cl.
*G06F 15/167*   (2006.01)
(52) U.S. Cl. ............................ 709/213; 711/117; 710/22
(58) Field of Classification Search .................. 709/213
See application file for complete search history.

(56) References Cited

U.S. PATENT DOCUMENTS

| | | | |
|---|---|---|---|
| 2003/0140051 A1* | 7/2003 | Fujiwara et al. ............... | 707/100 |
| 2003/0145045 A1* | 7/2003 | Pellegrino et al. ............ | 709/203 |
| 2004/0028063 A1* | 2/2004 | Roy et al. ...................... | 370/402 |
| 2004/0103261 A1* | 5/2004 | Honda et al. .................. | 711/202 |
| 2004/0123017 A1* | 6/2004 | Henry et al. ....................... | 711/6 |
| 2004/0225719 A1* | 11/2004 | Kisley et al. .................. | 709/212 |
| 2005/0091426 A1* | 4/2005 | Horn et al. ...................... | 710/33 |
| 2005/0102479 A1* | 5/2005 | Innan et al. ................... | 711/162 |
| 2006/0036777 A1* | 2/2006 | Innan et al. ...................... | 710/5 |
| 2006/0195676 A1* | 8/2006 | Honda et al. .................. | 711/202 |
| 2006/0206603 A1* | 9/2006 | Rajan et al. ................... | 709/223 |
| 2006/0259650 A1* | 11/2006 | Chou et al. ......................... | 710/8 |
| 2007/0124407 A1* | 5/2007 | Weber et al. .................. | 709/212 |
| 2007/0150677 A1* | 6/2007 | Homma et al. ............... | 711/162 |
| 2007/0162641 A1* | 7/2007 | Oztaskin et al. ................ | 710/22 |
| 2007/0174583 A1* | 7/2007 | Shinkai et al. ................ | 711/203 |
| 2007/0192558 A1* | 8/2007 | Honda et al. .................. | 711/165 |
| 2007/0239944 A1* | 10/2007 | Rupanagunta et al. ....... | 711/147 |
| 2008/0028143 A1* | 1/2008 | Murase ......................... | 711/114 |
| 2008/0091899 A1* | 4/2008 | Innan et al. ................... | 711/162 |
| 2008/0168209 A1* | 7/2008 | Davison ........................... | 711/6 |
| 2008/0168228 A1* | 7/2008 | Carr et al. ..................... | 711/117 |
| 2008/0313364 A1* | 12/2008 | Flynn et al. ..................... | 710/31 |
| 2009/0113420 A1* | 4/2009 | Pawlowski ....................... | 718/1 |
| 2009/0199041 A1* | 8/2009 | Fukui et al. ...................... | 714/6 |
| 2009/0292861 A1* | 11/2009 | Kanevsky et al. ............ | 711/103 |
| 2010/0057949 A1* | 3/2010 | Weber ............................. | 710/22 |
| 2011/0047356 A2* | 2/2011 | Flynn et al. ................... | 712/220 |

* cited by examiner

*Primary Examiner* — Firmin Backer
*Assistant Examiner* — Hamza Algibhah
(74) *Attorney, Agent, or Firm* — Haynes and Boone, LLP

(57) ABSTRACT

Methods and systems for improved performance in virtualized storage systems. Features and aspects hereof provide for a virtualization circuit integrated in each storage controller of a storage system. The virtualization circuit is operable to determine whether a request received from an attached host system will be processed locally by the receiving storage controller or will be processed by another storage controller of the storage system. If another storage controller is to process the request, the virtualization circuit is operable to transfer the request to the appropriate other storage controller. The virtualization circuit then receives result information from the other storage controller and returns such result information to the requesting host system. Integration of the virtualization circuit at below level of request processing of storage controllers improves performance of virtualization as compared to prior techniques.

18 Claims, 4 Drawing Sheets

CIRCUITS, SYSTEMS, AND METHODS TO INTEGRATE STORAGE VIRTUALIZATION IN A STORAGE CONTROLLER

BACKGROUND

1. Field of the Invention

The invention relates generally to storage virtualization and more specifically relates to circuits, systems and methods for implementing storage virtualization within a storage controller such as in a Redundant Array of Independent Disks (RAID) storage system.

2. Discussion of Related Art

Storage virtualization has grown in popularity especially in larger computer storage applications. Virtualized storage, in essence, hides from attached host systems the exact structure, layout, and location of storage devices and storage subsystems that are available to the host systems. Also, certain automated management functions may be performed at the level of virtualization management all hidden from the attached host systems. Exemplary management functions may include automated backups, mirroring/replication, shadowing, etc. Thus data stored in such virtualized storage systems may be mapped, relocated, mirrored, replicated, and otherwise managed to improve efficiency of storage operations in the computing environment all without knowledge of the host system applications.

As presently practiced, virtualization is handled by a virtual storage control component. Such a virtualization control component is presently implemented as software operable on the multiple, cooperating host systems that wish to couple to the virtualized storage systems. Alternatively, as presently practiced, storage virtualization may be implemented as a stand alone network appliance coupled between the host systems and the storage components to be managed as a virtualized storage system.

Storage virtualization as presently practiced presents problems of performance and scalability. Where the storage virtualization control is implemented as software elements in the various host systems, performance in access to the underlying storage systems through the virtualization layer may be impaired by slow software execution and required generalized network communications among the cooperating host systems. For example, some common features such as automated mirroring of a logical volume, shadow copies/snapshots of a logical volume, storage clustering, and the like may be severely limited in performance due to the software intervention of the virtualization software layers cooperating among the various attached host systems.

Where storage virtualization is implemented as a stand alone network appliance interposed between the host systems and the underlying storage systems, the virtualization may not scale well with the size and complexity of topology of the underlying storage systems nor with the size and complexity of topology of the attached host systems. A small virtualization controller may be cost effective in a small computing environment with limited underlying storage needs and limited host system connectivity. However, as storage requirements grow and/or as the number of host systems grow, the virtualization control component may need to be replaced with a larger component capable of managing larger, more complex underlying storage systems and host system networks.

Thus it is an ongoing challenge to maintain desired performance levels in access to underlying storage systems through a virtualization layer while providing enhanced scalability and flexibility in the configuration of the underlying storage capacity and configuration.

SUMMARY

The present invention solves the above and other problems, thereby advancing the state of the useful arts, by providing methods and systems involving a virtualization circuit integrated within the controllers of each storage system to provide the virtualization capabilities within the storage systems themselves. Thus the overhead associated with host-based software virtualization solution of the past is reduced. Further, scalability issues associated with stand alone virtualization components are alleviated.

In one aspect hereof, a storage controller adapted for coupling a host system to storage devices is provided. The controller includes a request processor adapted for coupling to locally accessible storage devices and adapted to process a request from a host system by accessing the locally accessible storage devices. The controller also includes a virtualization circuit coupled to the request circuit. The virtualization circuit is adapted to receive a request from a host system and is also adapted to determine whether this or another storage controller will process the request. The virtualization circuit is still further adapted to forward the request to the request processor responsive to a determination that this storage controller will process the request and to forward the request to another request processor of said another storage controller responsive to a determination that the request will be processed by said another storage controller.

Another aspect hereof provides a storage virtualization method operable in a storage system having multiple storage controllers. The method includes receiving a request from a host system in a first storage controller and determining within a virtualization circuit of the first storage controller whether the request will be processed by the first storage controller or by a second storage controller. The method then includes processing the request in the first storage controller in response to a determination that the first storage controller will process the request. The method also includes forwarding the request through the virtualization circuit to the second storage controller for processing in response to a determination that the second storage controller will process the request.

DETAILED DESCRIPTION OF THE DRAWINGS

Figure 1:
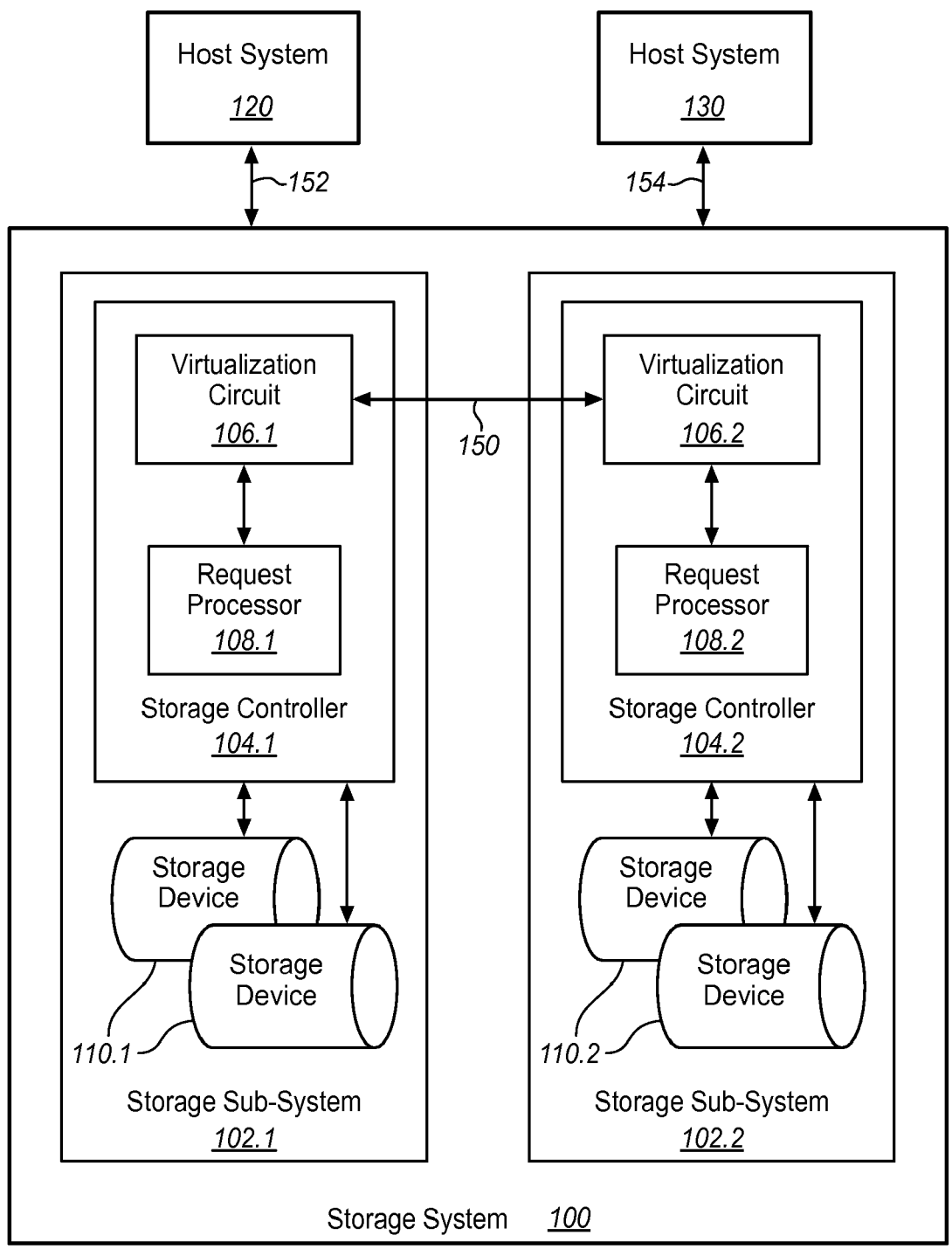
FIG. 1 is a block diagram of a storage system having storage controllers enhanced in accordance with features and aspects hereof to include a virtualization circuit within each storage controller to provide virtualized storage to attached systems.

FIG. 1 is a block diagram of a storage system 100 incorporating multiple storage subsystems 102.1 and 102.2, each including a storage controller 104.1 and 104.2. Each controller 104.1 and 104.2 may incorporate a virtualization circuit 106.1 and 106.2, respectively, in accordance with features and aspects hereof. Storage system 100 is coupled to one or more host systems 120 and 130 through corresponding communication paths 152 and 154, respectively. Communication paths 152 and 154 represent any of several well-known, commercially available communication media and protocols for coupling a host system to a storage subsystem 100 including, for example, Infiniband, Fibre Channel, Internet, serial attached SCSI (SAS), parallel SCSI, serial advanced technology attachment (SATA), and other parallel and high speed serial communication media and protocols. In particular, paths 152 and 154 may represent a communication fabric such as a SAS domain fabric or an Infiniband fabric.

As depicted, storage system 100 may include multiple storage subsystems 102.1 and 102.2 each defined (logically and/or physically) by incorporation of a storage controller 104.1 and 104.2, respectively, and/or one or more storage devices 110.1 and 110.2, respectively. Each storage controller 104.1 and 104.2 is coupled to associated storage devices 110.1 and 110.2, respectively, by any of several well-known communication media and protocols including SAS, SATA, parallel SCSI, parallel ATA, etc. Each storage controller 104.1 and 104.2 includes an associated request processor 108.1 and 108.2, respectively. Request processor 108.1 and 108.2 represents standard logic circuits, processors, and interface logic normally present within a storage controller adapted both for communicating with an attached the host system (120 and/or 130) and for coupling and communicating with associated storage devices 110.1 and 110.2, respectively. Further, request processors 108.1 and 108.2 include requisite processing (one or more general or special purpose processors) and suitable memories for receipt and processing of a host request.

Those of ordinary skill in the art will further recognize that each controller (104.1 and 104.2) could have an associated mirrored or redundant controller paired with it. Thus the particular number of controllers in FIG. 1 is intended as merely exemplary for simplicity of this discussion. Any number of controllers and associated redundant mirrors may be configured in a fully functional storage system 100. Still further, those of ordinary skill in the art will recognize that the storage controllers 104.1 and 104.2 may be physically contained in the same enclosure or may configured as so called "blades" or "pizza boxes" such that they need not be in the same physical enclosure as other elements of system 100.

In accordance with features and aspects hereof, each storage controller 104.1 and 104.2 includes an associated virtualization circuit 106.1 and 106.2, respectively. Each virtualization circuit 106.1 and 106.2 provides customized high-speed logic within each storage controller for determining whether a received request is most appropriately handled by the corresponding storage controller 104.1 and 104.2, respectively, or appropriately handled by another controller. In other words, virtualization circuit 106.1 within storage controller 104.1 provides high speed custom processing to determine whether the associated local controller 104.1 should handle a particular received a request or whether another controller (e.g., 104.2) should handle a particular received request. Responsive to the determination within virtualization circuit 106.1 or 106.2, a received request is forwarded either to the associated local request processor 108.1 or 108.2, respectively, or is forwarded via path 150 to the other controller 104.2 or 104.1, respectively. Communication path 150 may be any suitable high speed communication channel coupling the storage controllers 104.1 and 104.2. Path 150 may couple the controllers 104.1 and 104.2, for example, via their respective virtualization circuits 106.1 and 106.2. For example, a high speed processor bus architecture and/or memory bus architecture may be utilized for such coupling between the virtualization circuits 106.1 and 106.2. Or, for example, a high speed serial communication link such as InfiniBand or other well-known, commercially available communication paths may be utilized for coupling virtualization circuits 106.1 and 106.2.

As discussed in further detail herein below, each virtualization circuit 106.1 and 106.2 may include an associated lookup table for rapidly determining which storage controller 104.1 or 104.2 most appropriately handles a received host request. In addition, each virtualization circuit 106.1 and 106.2 may include a remote direct memory access circuit (RDMA) for performing high speed transfers of information between the virtualization circuits 106.1 and 106.2 and between each virtualization circuit and a requesting host system.

Those of ordinary skill in the art will readily recognize numerous additional and equivalent features and components within a fully operational storage system 100 and its storage controllers 104.1 and 104.2. Such additional and equivalent details are omitted from FIG. 1 for simplicity and brevity of this discussion. Still further, those of ordinary skill in the art will readily recognize that any number of storage devices 110.1 and 110.2 may be associated with each storage subsystem 102.1 and 102.2, respectively. Further, any number of storage subsystems 102.1 and 102.2 and their associated storage controllers 104.1 and 104.2 may be incorporated in a fully functional storage system 100. Thus, FIG. 1 is intended merely as representative of one exemplary embodiment of features and aspects hereof.

Figure 2:
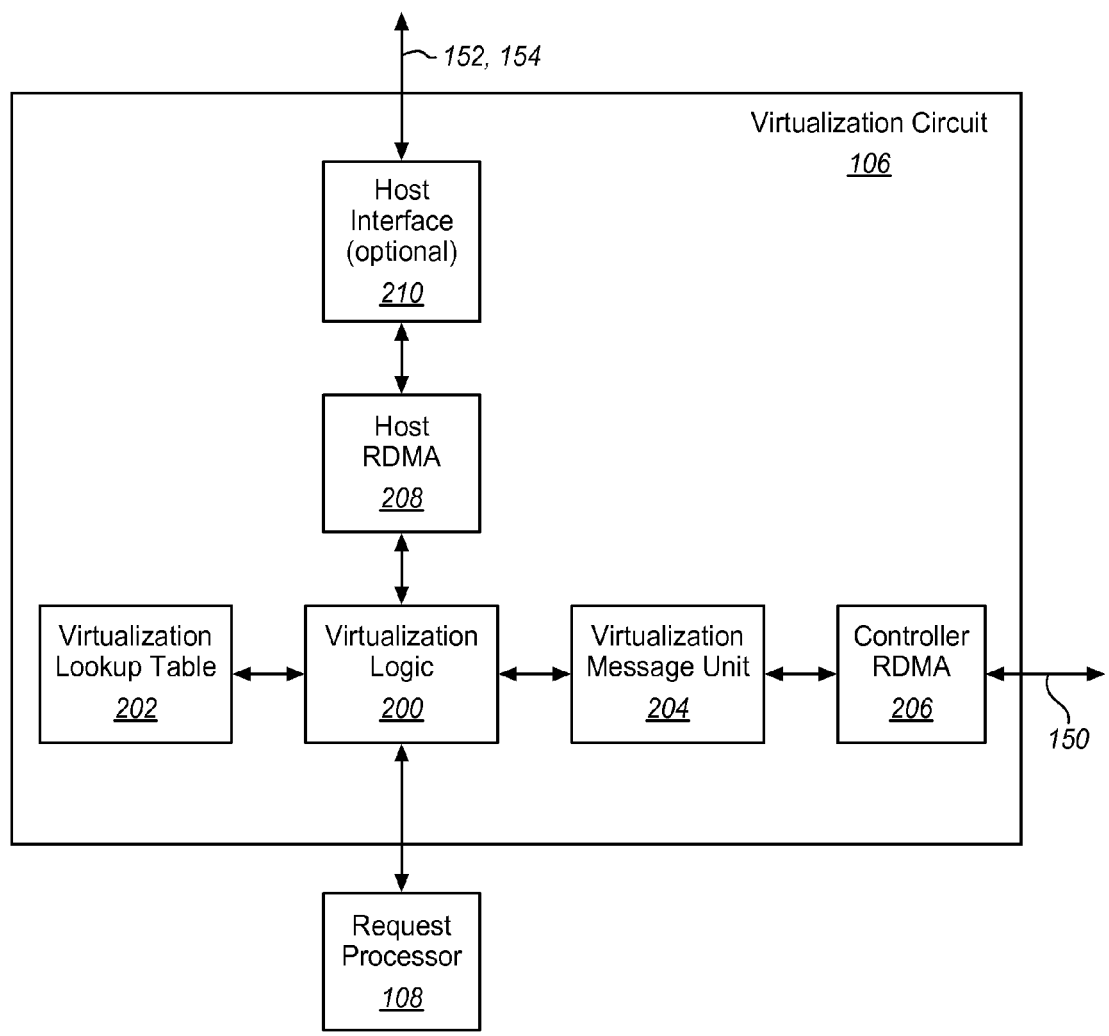
FIG. 2 is a block diagram providing exemplary additional details of a virtualization circuit of FIG. 1 in accordance with features and aspects hereof.

FIG. 2 is a block diagram providing exemplary additional details of a virtualization circuit 106 as may be incorporated in an enhanced storage controller in accordance with features and aspects hereof. Virtualization circuit 106 (e.g., circuits 106.1 or 106.2 of FIG. 1) includes virtualization logic 200 for determining which of multiple storage controllers is best suited for handling a received host request. The virtualization logic in each controller can determine the controller best suited to handling a request from initial mappings in a lookup table 202 that maps portions of storage to a particular volume and logical unit number. When a request comes in to a controller, the virtualization logic 200 inspects lookup table 202 to determine which controller really "owns" the storage portion referenced by the request. The request is then forwarded to the owning controller to process the request in its local cache. The owning controller then notifies the original controller of completion by returning a virtual memory address which the original controller uses to program the host interface chip to RDMA the data directly to the host from the owning controller by way of the proxy/original controller. This eliminates any cache coherency problems since the data is always cached in the owning controller, and increases performance since the data is not re-buffered in the proxy/original controller. Virtualization logic 200 may be coupled, for example, through host RDMA 208 to a host interface component 210. Host interface component 210 may be integrated (as shown) within virtualization circuit 106 or may be an external component coupled to the virtualization circuit 106 within the storage controller utilizing the virtualization circuit.

Upon receipt of a host request, virtualization logic 200 is operable to utilize virtualization lookup table 202 to determine from parameters of the received request which storage controller is best suited to process the received request. The request parameters utilized in accessing the virtualization lookup table 202 may include, for example, a volume identifier, a starting address for data to be accessed, a length or extent of the request to be processed, etc. Virtualization lookup table 202 may be stored in any suitable memory component integrated within virtualization circuit 106 including, for example, flash memory, high-speed RAM, programmable read only memory, etc. By locating and inspecting an appropriate entry in virtualization lookup table 202, virtualization logic 200 may determine whether the storage controller in which the virtualization circuit is embodied is best suited for processing the received host request. If so, virtualization logic 200 forwards the received request to the local request processor 108 associated with the storage controller that embodies the virtualization circuit 106. Request processor 108 therefore represents any suitable "fast path" processing logic within the storage controller embodying the virtualization circuit 106. Thus, request processor 108 performs further processing required to complete the received host request. Though not shown in FIG. 2, request processor 108 may include host interface logic as well as associated storage device interface logic for processing a received host request.

Conversely, if virtualization logic 200 determines that another controller is best suited for processing a received host request, the request commands and data associated with the request is forwarded through the virtualization message unit 204 for transfer to the identified other storage controller. Virtualization message unit 204 may utilize controller RDMA 206 to transfer the request commands and associated data to the identified other controller as determined by virtualization logic 200. In general, virtualization message unit 204 provides processing in cooperation with virtualization logic 200 to coordinate the transfer of one or more requests to any of multiple other storage controllers. To coordinate overlapping transfers associated with multiple controllers, virtualization message unit 204 may utilize tagging or other suitable identification for associating each transfer with a corresponding host request. The message unit 204 serves as an acceleration unit to allow the request (command and associated context information) to be quickly passed to the owning controller. This message unit 204 provides the buffering capabilities to store them and notify the owning processor so that the commands can be inserted into the command pool of the owning controller. It also provides the status messaging and the capability to pass the virtual address so that RDMA can transfer any data or status directly between the requesting host system and the cache memory of the owning controller. Further exemplary details of the operation of virtualization logic 200 are discussed herein below with regard to exemplary methods operable within virtualization circuit 106.

Those of ordinary skill in the art will readily recognize numerous additional and equivalent elements within a fully functional virtualization circuit 106. Thus, FIG. 2 is intended merely as exemplary of one possible embodiment of features and aspects hereof within a virtualization circuit 106.

Figure 3:
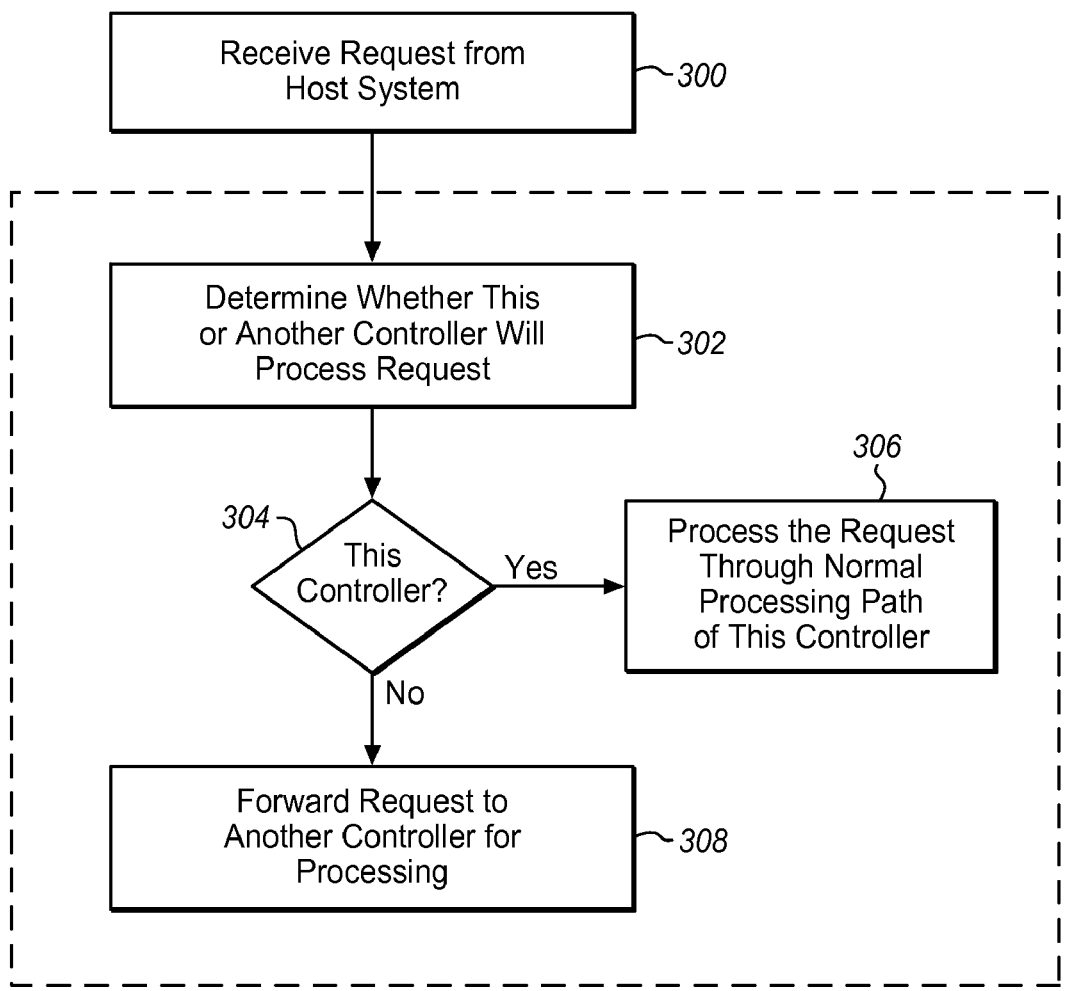
FIGS. 3 and 4 are flowcharts describing exemplary methods operable in a virtualization circuit within a storage controller in accordance with features and aspects hereof.

FIG. 3 is a flowchart describing an exemplary method in accordance with features and aspects hereof operable within a virtualization circuit of a storage controller such as virtualization circuit 106 and controller 104 of FIGS. 1 and 2. Step 300 first receives a request from an attached host system. As noted above, host interface logic components may be integrated within the virtualization circuit per se or may be external to the virtualization circuit but integrated within the storage controller embodying the virtualization circuit. Thus processing of step 300, while performed within the storage controller, may be performed either within the virtualization circuit directly or within other host interface circuits associated with the storage controller. Remaining steps 302 through 306 of FIG. 3 are generally performed within the virtualization circuit (and/or virtualization message unit) and hence highlighted with a dashed line box. Step 302 determines whether this storage controller (the controller that embodies this virtualization circuit) or another storage controller will process the received host request. As noted above, a virtualization lookup table may be accessed based upon parameters of the host request to determine which storage controller is best suited for processing of the received host request. Step 304 then detects whether step 302 determined that the local controller should process the received request or whether another controller is best suited. If this controller is best suited for processing the received request, step 306 processes the request through the normal processing path of this storage controller. As noted above, the normal processing path involves well-known storage management processing by general and special purpose processors of the storage controller adapted to communicate directly with the requesting host system and adapted to communicate with attached storage devices coupled to this storage controller. Details of such normal path processing in a storage controller are generally known to those of ordinary skill in the art and therefore omitted here for simplicity and brevity of this discussion. If step 304 detects that step 302 determined that another storage controller is best suited for processing the received host request, step 308 forwards the received host request and any associated data to the identified other controller for processing therein. As discussed further herein below, the transferred information may include command information as well as data associated with the received host request. The data may be transferred directly or may be forwarded to another controller represented as a DMA scatter/gather list to be utilized by the identified other controller for processing of the host request. In addition, step 308 receives any returned status information and/or resulting data from processing by the other controller. The virtualization circuit then returns the status and any returned data to the attached, requesting host system. The virtualization logic may include virtual address mapping abilities to do the address translation between its controller and an owning controller processing a forwarded request. A host interface chip on the proxy controller is configured to DMA (RDMA) data in a local virtual address space and through proper virtual address mapping is "reaching" through a virtual memory window into the memory of the owning controller. Thus the proxy controller RDMAs the data directly from the owning controller to the host by way of the host interface chip on the proxy controller. Various additional and equivalent steps will be readily apparent to those of ordinary skill in the art and thus are omitted from FIG. 3 simply for simplicity and brevity of this discussion.

Figure 4:
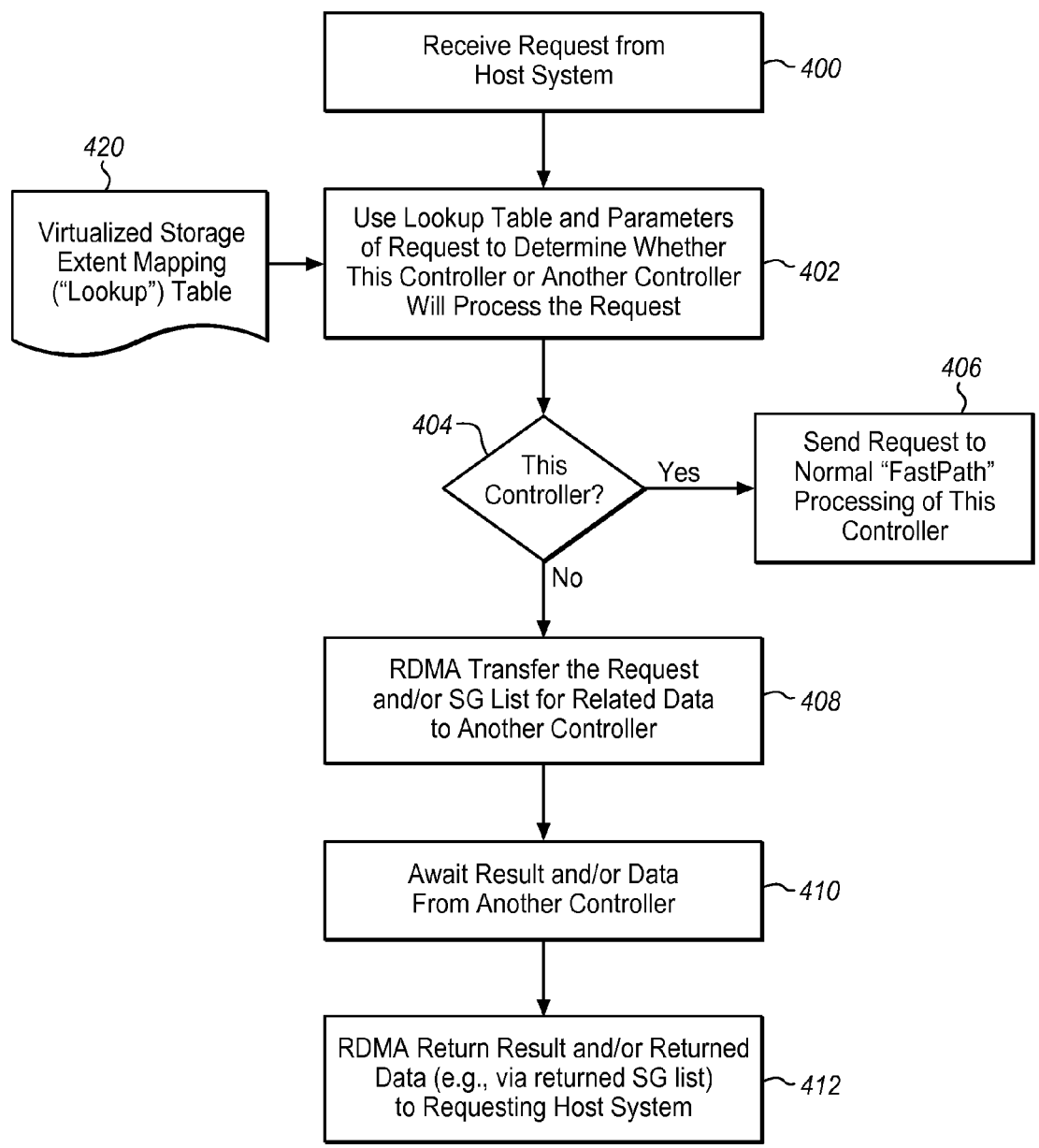

FIG. 4 is a flowchart of another exemplary method operable within a virtualization circuit of the storage controller in accordance with features and aspects hereof. The flowchart of FIG. 4 is similar to that of FIG. 4 but with exemplary additional details provided. Step 400 first receives a request from an attached host system. As noted above with respect to FIG. 3, the virtualization circuit may incorporate host interface logic such that step 400 is performed within the virtualization circuit per se. Alternatively, host interface logic may be the external to the virtualization circuit but integrated within the same storage controller such that step 400 is performed outside the virtualization circuit. Regardless, step 402 then utilizes lookup table 420 accessed based on parameters of the received host request. As noted above, parameters utilized to access the virtualized storage extent mapping or lookup table 420 may include a volume ID, starting logical address for any data to be accessed, and the length or extent of data to be accessed. Numerous other parameters useful in accessing the lookup table 420 will be readily apparent as a matter of design choice to those of ordinary skill in the art.

Based on the information in the located entry of lookup table 420, step 402 determines whether this storage controller or another controller is best suited to process the received host request. Step 404 then detects whether step 402 determined that this local controller is best suited and, if so, step 406 forwards the received host request to the normal "fast path" processing logic of this controller. Otherwise, step 408 next utilizes RDMA features within the virtualization circuit to transfer the received request and/or related data to the identified other controller. The related data (if any) may be transferred directly to the other controller or may be represented by a scatter/gather list forwarded to the other controller for use by its RDMA components in accessing the data associated with the host request. The scatter/gather list to be used for the RDMA transfer may be supplied by the owning controller to the proxy controller. Virtual addresses contained in such scatter/gather lists are translated as required for use by the proxy controller. Thus the proxy controller host interface capabilities may transfer data directly between the host system and the owning controller's local cache memory through the RDMA features and virtual address mapping of the proxy controller. Step 410 then awaits results of the processing of the transferred host request on the other controller. As noted above, a virtualization message unit associated with the virtualization logic may coordinate concurrent/overlapping exchange of commands, status, and data for processing of multiple host requests. Thus the "wait" of step 410 may be implemented using any of several well known programming/logic paradigms to interrupt ongoing processing of the virtualization circuit and to tag or associate various message transfers with a corresponding one of the multiple host requests. The other controller responsible for processing the forwarded host request eventually returns status and/or related data representing completion of the transferred host request. As above, any returned data may be transferred directly back to the virtualization circuit or may simply be represented by a returned scatter/gather list for use in the host RDMA of this storage controller in returning data to the requesting host system. Lastly, step 412 utilizes RDMA circuits within the virtualization circuit to return the status information and any related return data to the requesting host system.

Those of ordinary skill and the art will readily recognize numerous additional and equivalent steps in the method of FIG. 4. Such additional and equivalent steps are omitted for simplicity and brevity of this discussion.

The circuits, systems, and methods described above provide enhanced performance and scalability as compared to present practices in storage virtualization. Virtualization performed within the storage system using storage controllers with virtualization circuits in accordance with features and aspects hereof enhances performance by comparison with present systems and methods that implement storage virtualization as software programs in cooperating host systems. In addition, the virtualization circuit enhanced storage controllers in accordance with features and aspects hereof improve on the scalability as compared to prior standalone network appliances that implemented storage virtualization. As each storage controller is added to a storage system or as new storage systems are added, all storage controllers include a virtualization circuit to provide high speed storage virtualization as the storage capacities grow. Still further, the enhanced communication between controllers may be used for redundancy mirroring of data in caches of multiple controllers. Any number of storage controllers with the enhanced virtualization logic features and aspects hereof may synchronize the content of mirrored cache memories among the plurality of controllers.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage controller adapted for coupling a host system to storage devices, the controller comprising:
   a request processor circuit adapted for coupling to locally accessible storage devices and adapted to process a request from the host system by accessing the locally accessible storage devices, the host system request referencing a data storage portion;
   a virtualization circuit coupled to the request processor circuit the virtualization circuit adapted to receive the request from the host system and adapted to determine, based on an association between this or another storage controller and the data storage portion referenced by the host system request, whether said this or said another storage controller will process the request and further adapted to forward the host system request to the request processor circuit responsive to a determination that said this storage controller will process the request if said this storage controller is associated with the data storage portion referenced in the host system request and further adapted to forward the request to another request processor circuit of said another storage controller responsive to a determination that the host system request will be processed by said another storage controller if said another storage controller is associated with the data storage portion referenced in the host system request,
   wherein the virtualization circuit is distinct from the request processor circuit; and
   a communication channel coupling the storage controller to said another storage controller, wherein the communication channel is independent of any communication channels used for front end or back end communications and wherein the storage devices locally accessible by the request processor circuit of said this storage controller are separate from other local storage devices accessible by a request processor circuit of said another storage controller.

2. The storage controller of claim 1 further comprising:
   a virtualization lookup table coupled to the virtualization circuit,
   wherein the virtualization circuit is further adapted to determine whether this storage controller or another storage controller will process the request by locating an entry in the virtualization lookup table corresponding to an extent defined by the request.

3. The storage controller of claim 1 wherein the virtualization circuit further comprises:
   a remote direct memory access (RDMA) circuit adapted to communicate with said another storage controller to exchange information with said another storage controller relating to processing of the request by said another storage controller.

4. The storage controller of claim 3
wherein the virtualization circuit is further adapted to use the RDMA circuit to exchange information with said another controller wherein the information includes one or more of:
command messages, status messages, and data scatter/gather lists.

5. The storage controller of claim 3 wherein the virtualization circuit further comprises:
host system interface logic, coupled to the RDMA circuit, adapted for controlling communication with attached host systems,
wherein the virtualization circuit is adapted to use the RDMA circuit in exchanges between an attached host and said another storage controller.

6. A storage virtualization method operable in a storage system having multiple storage controllers, the method comprising:
receiving a request from a host system in a first storage controller of said multiple storage controllers, the host system request referencing a data storage portion;
determining within a virtualization circuit of the first storage controller whether the request will be processed by the first storage controller or by a second storage controller, wherein the determining is based on an association between the first storage controller or the second storage controller and the data storage portion referenced by the host system request;
processing the request in a request processor circuit of the first storage controller in response to a determination that the first storage controller will process the request, wherein the virtualization circuit is distinct from the request processor circuit; and
forwarding the request through the virtualization circuit to a request processor circuit of the second storage controller, via a communication channel independent of any communication channels used for front end or back end communications, for processing in response to a determination that the second storage controller will process the request, wherein the first storage controller and the second storage controller are each associated with a separate set of locally accessible storage devices.

7. The method of claim 6 wherein the step of receiving the request is performed within the virtualization circuit of the first controller.

8. The method of claim 6 wherein the step of determining further comprises:
using parameters of the request and a lookup table associated with the virtualization circuit to determine whether the first storage controller or the second storage controller will process the request.

9. The method of claim 8 wherein the step of using further comprises:
using a starting address parameter and a length parameter of the request and the lookup table to determine whether the first storage controller or the second storage controller will process the request.

10. The method of claim 6 wherein the step of forwarding further comprises:
exchanging information regarding the request between the virtualization circuit to the second storage controller, wherein the information includes one or more of: command messages, status messages, and data scatter/gather lists.

11. The method of claim 10 wherein the step of exchanging further comprises: using a remote direct memory access (RDMA) circuit associated with the virtualization circuit to exchange the information with the second storage controller.

12. The method of claim 6 further comprising:
returning result information received from the second storage controller to the host system.

13. The method of claim 12 wherein the step of returning information further comprises:
using a remote direct memory access (RDMA) circuit associated with the virtualization circuit to return the result information to the host system.

14. A storage system adapted for coupling a host system, the system comprising:
a plurality of storage devices; and
a plurality of storage controllers coupled to the storage devices,
wherein each storage controller comprises:
a request processor circuit coupled to locally accessible storage devices of the plurality of storage devices and adapted to process a request from the host system by accessing the locally accessible storage devices, the host system request referencing a data storage portion; and
a virtualization circuit coupled to the request processor circuit, the virtualization circuit adapted to:
receive the host system request;
determine, based on an association between this or another storage controller and the data storage portion referenced by the host system request, whether said this or said another storage controller will process the host system request;
forward the host system request to the request processor circuit responsive to a determination that said this storage controller will process the request if said this storage controller is associated with the data storage portion referenced in the host system request; and
forward the host system request to another request processor circuit of said another storage controller responsive to a determination that the host system request will be processed by said another storage controller if said another storage controller is associated with the data storage portion referenced in the host system request,
wherein the storage devices locally accessible by the request processor circuit of said this storage controller are separate from other local storage devices accessible by a request processor circuit of said another storage controller.

15. The system of claim 14 each storage controller further comprising: a virtualization lookup table coupled to the virtualization circuit,
wherein the virtualization circuit is further adapted to determine whether this storage controller or another storage controller will process the request by locating an entry in the virtualization lookup table corresponding to an extent defined by the request.

16. The system of claim 14 wherein the virtualization circuit in each storage controller further comprises:
a remote direct memory access (RDMA) circuit adapted to communicate with said another storage controller to exchange information with said another storage controller relating to processing of the request by said another storage controller.

17. The system of claim 16 wherein the virtualization circuit in each storage controller is further adapted to use the RDMA circuit to exchange information with said another controller wherein the information includes one or more of: command messages, status messages, and data scatter/gather lists.

18. The system of claim 16 wherein the virtualization circuit in each storage controller further comprises:

host system interface logic, coupled to the RDMA circuit, adapted for controlling communication with attached host systems, wherein the virtualization circuit is adapted to use the RDMA circuit in exchanges between an attached host and said another storage controller.

* * * * *